Dec. 18, 1934.  A. MERLE  1,985,050
AIR CONDITIONING SYSTEM
Filed May 15, 1933  2 Sheets-Sheet 1

Inventor:
André Merle
by Louis L. Ansard
his Attorney

Dec. 18, 1934.   A. MERLE   1,985,050
AIR CONDITIONING SYSTEM
Filed May 15, 1933    2 Sheets-Sheet 2
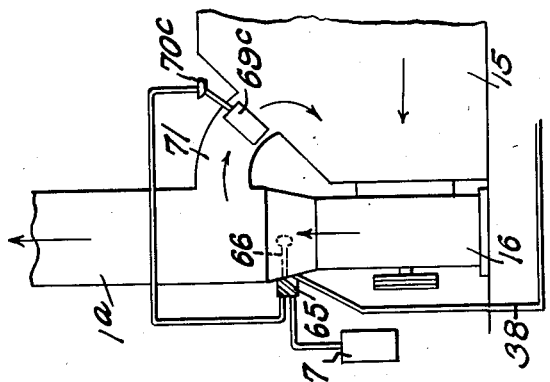
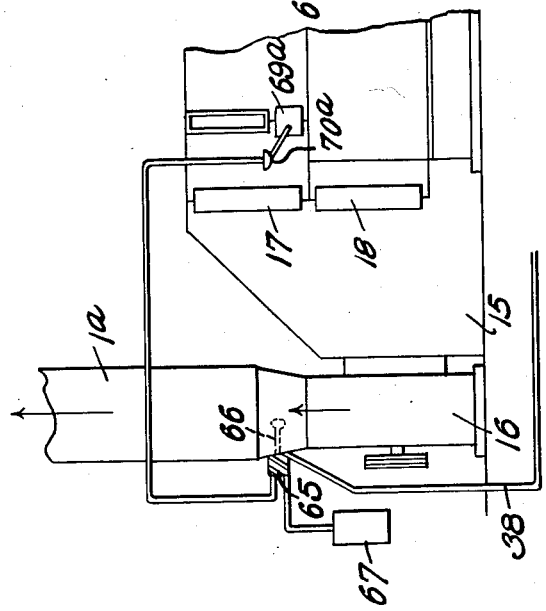
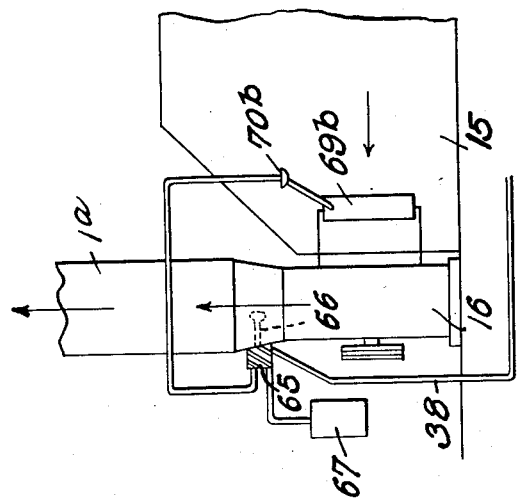
Inventor:
André Merle
by Louis L. Ansart
his Attorney Patented Dec. 18, 1934

1,985,050

UNITED STATES PATENT OFFICE 1,985,050

AIR CONDITIONING SYSTEM

André Merle, New York, N. Y., assignor of one-half to Ernest Williams, Scarsdale, N. Y.

Application May 15, 1933, Serial No. 671,189

12 Claims. (Cl. 257—8)

This invention relates to air conditioning systems for establishing and maintaining desirable air conditions in one or more rooms or enclosures. In this connection it is recognized that the comfort of the occupants of such rooms or enclosures is dependent upon a number of factors, including temperature, humidity, quantity and purity of the air, and also the movement of the air.

An important object of the present invention is to provide improvements over air conditioning systems and methods heretofore in use. Important features relate to economical and generally automatic production, control and maintenance of desired conditioning of, for example, temperature, humidity, quantity of air and air movement in one or more rooms or enclosures.

According to a preferred embodiment of the invention, fresh air and reused air, returned from a conditioned enclosure, are admitted to a plenum or mixing chamber and intermixed. The proportion of fresh air and reused air may vary dependent upon various factors such as the heat and humidity removed from the conditioned space, and may be balanced with the heat and humidity of the outdoor or fresh air. The mixture favors fresh air rather than reused air as compared with former practice but involves a balancing effect therebetween and therefore between factors on the one hand conducive to health and comfort and factors on the other hand conducive to economy. From this mixing chamber for fresh air and reused air, a portion of the mixture is passed through a conditioner or dehumidifier, where it is reduced in wet bulb temperature by suitable refrigerating means or methods, and discharged into a second mixing chamber where it is mixed with the balance or remainder of the original mixture shunted around the conditioner and preferably passed through a filter device where this air is cleaned, its humidity decreased or left unchanged and its dry bulb temperature decreased or left unchanged.

The proper wet bulb and dew point temperature of the air leaving the conditioner may be attained directly by means of a primary thermostat in accordance with the setting thereof, and a primary hygrostat, both preferably located in a duct through which reused air is returned to the first mixing chamber. One function of these two instruments or devices is to so regulate the functioning of the cooling medium (refrigeration) that the air leaving the conditioner will, when remixed with the shunted air, be of the proper wet bulb and dew point temperature and another function is to control the proportions of air brought together from different sources of supply, in that, when finally mixed as by a fan or fans, on its way to the place to be conditioned, the mixture will be of the correct temperature, humidity and air volume to maintain and produce the desired temperature and humidity within the space to be conditioned. In order to maintain substantially predetermined temperature relations between outdoors and indoors, the primary thermostat may be controlled by a thermostat located at the fresh air intake, and in order to maintain corresponding relations as to humidity the primary hygrostat may also be controlled by the thermostat at the fresh air intake. Thus the temperature and humidity of the conditioned space will vary with the outdoor temperature either wet bulb or dry bulb. Provision may also be made of a suitable device such as a thermostat in the supply fan discharge or the supply duct for the space to be conditioned for the general purpose of obtaining and maintaining a predetermined and balanced leaving temperature between that of outdoors and the setting of the primary thermostat in the reused duct.

At all times the air delivered to the conditioned space will be balanced as to various conditioning factors and these conditions will be controlled by the primary thermostat and the primary hygrostat, each located in the reused air duct or room in the ventilated space and these primary control instruments will be compensated and balanced with and by outdoor air conditions. In this manner, the differential between the indoor temperature and humidity will be balanced with that of the outdoor air, thus producing conditions conducive to comfort and health, and there will be substantial prevention of overcooling or overheating the conditioned space, thus enabling more economical operation and producing and maintaining more healthful and comfortable air conditions within the conditioned space. At certain times, such as at changes of seasons, the primary thermostat and the primary hygrostat may be reset for the following season and maintained in these settings until a re-setting is required. Such changes in the settings of these instruments may be made at the instruments or they may be made from a distance by suitable remote control devices or instruments.

The system and arrangement of apparatus and controls is such that full use may be made of the wet bulb temperature depression of the outdoor or fresh air in that whenever the wet bulb temperature of the fresh air is below that of the conditioned space use may be made of the cooling qualities of the fresh air thus enabling a saving in the employment of refrigeration.

The finally conditioned air may be drawn from the conditioning apparatus by suitable means such as a fan from which it passes through a supply duct to the ventilated space. In varying the proportion of different kinds of air to be mixed, the requirements as to the amount of air to be supplied vary and, if the fan be run at the same rate, there will be undesirable variations in air pressure. Such disadvantageous conditions may be avoided by use of suitable control means, such as a constant pressure plenum producer device or instrument in the supply duct, connected with a variable speed controller for the supply fan and/or a damper or dampers in the supply and/or suction ducts adjacent to the supply fan and/or a dampered bypass between the fan outlet duct and the fan suction duct. This last arrangement is particularly advantageous inasmuch as it will tend to prevent surging and maintain the desired temperature and humidity without the necessity of varying the control devices. Variation in the number of rooms or the space to be ventilated would also affect the requirements as to the operations of the fan.

For a fuller understanding of the nature and objects of the invention, reference may be had to the following description taken in connection with the accompanying drawings in which;

Fig. 2 illustrates a modified form of constant pressure plenum producing means; and Figs. 3 and 4 illustrate other modified forms.

Figure 1:
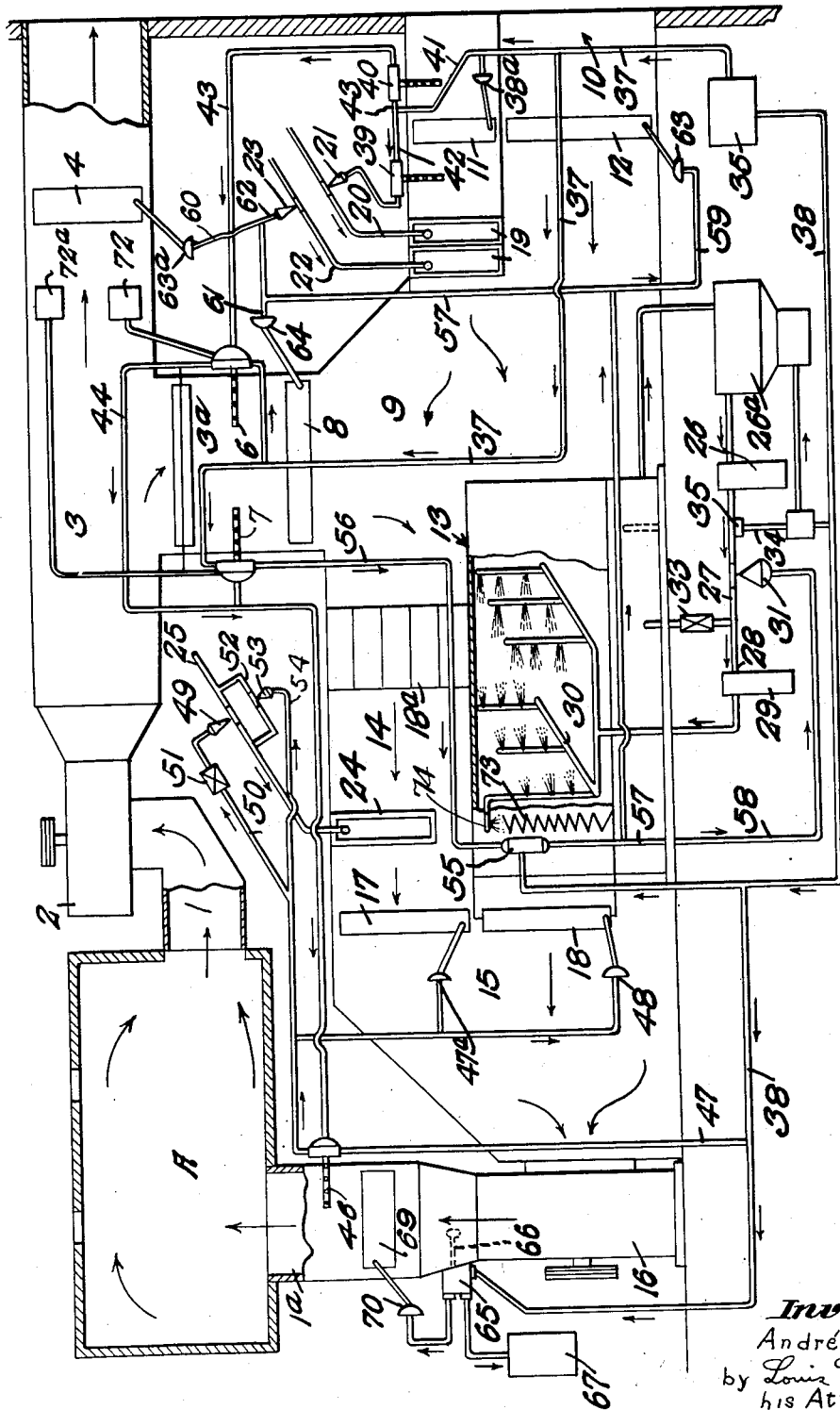
Fig. 1 is a diagrammatic representation of a system embodying important features of the invention.

In the drawings, the numeral 1 designates an exhaust duct through which used air is drawn from a room or enclosure A, or spaces, to be ventilated. It should be understood that such an enclosure may be provided with customary doors and windows and that in practice there may be a plurality of both inlets and outlets distributed throughout the enclosure to be ventilated and that these inlets and outlets may be connected respectively with a main supply duct 1a and said exhaust duct 1. From the exhaust duct 1 the air is drawn by an exhaust fan 2 and discharged into an exhaust chamber 3. At one part of the exhaust chamber the used air can be discharged into the atmosphere through a relief opening controlled by a relief damper 4 and at another part of the exhaust chamber the portion of used air to be reused may be discharged into a reused air duct 3a containing the sensitive portions of suitable control devices, such as a primary dry bulb thermostat 6 and a primary hygrostat 7 of which the functions will be brought out more clearly hereinafter.

From the duct 3a the reused air passes through a large reversed air damper 8 into a plenum or mixing chamber 9 into which fresh air is admitted through an intake 10 to replace air discharged from the system and also to assist in producing the desired conditions including those of temperature and humidity. Admission of fresh air through the intake 10 is controlled partly by a small fresh air damper 11 which is always open during operation and without automatic control except for opening and closing when the apparatus is put into or out of use, and partly by a large fresh air damper 12 automatically controlled in a manner to be brought out hereafter.

The mixing chamber 9 is preferably formed around an air conditioner or dehumidifier 13, which may be of any suitable type (spray, coil or chemical or any combination thereof). The fresh air and reused air are intermixed in varying proportions depending upon the heat and/or the humidity removed from the conditioned space and balanced with the heat and/or humidity of the fresh air taken in from out doors. The mixture favors fresh air rather than reused air, but the determination of the proportions involves a balancing of the requirements for health and comfort with the requirements for economy.

The mixing chamber 9 in which reused air and fresh air are mixed is connected, through the conditioning element or dehumidifier 13 and through a duct or shunt 14, with a mixing chamber 15 in which conditioned air and unconditioned air, both drawn from chamber 9, are mixed. The flow of air through the conditioner 13 and the duct 14 into the mixing chamber 15 is induced by a fan 16 which serves as a supply fan for the enclosure to be ventilated and delivers air into the main supply duct 1a for said enclosure. It is desirable of course to vary the proportions of the amounts of air passing through the conditioner 13 and duct 14, and this may be done by installing a small air damper 17 in the duct 14 and a damper 18, which may properly be called a dehumidifier damper, adjacent to the outlet end of the dehumidifier 13. By opening one of these dampers and closing the other, the relative magnitudes of flow of the two air currents may be varied substantially as desired. Preferably the shunt 14 is provided with an air filter 18a.

At different times of year, for example, fall, winter and spring, the temperature of the outside air may be so low that it becomes necessary to heat at least a part of the fresh air admitted into the mixing chamber 9. As here shown this may be done by providing a plurality of heating units or preheaters 19 arranged to heat the air admitted through the small fresh air damper 11. It will be evident that by using a plurality of preheaters 19 instead of one better regulation of the heating can be obtained. In the illustrative embodiment of the invention there are two preheaters 19, the one which acts first on the incoming fresh air being connected with a steam line 20 controlled by a suitable valve 21, and the second one being connected with another stream line 22 controlled by a suitable valve 23. As will be brought out hereinafter these valves 21 and 23 may be controlled automatically in accordance with certain conditions in the system.

In winter and to a lesser extent in spring and fall, the air discharged from the dehumidifier 13 may be at so low a temperature that the temperature of the final mixture of conditioned, fresh and reused air in chamber 15 will be too low to produce the proper temperature in the space to be ventilated. To improve conditions of this sort use may be made of a reheater 24 in the duct 14. This reheater may be heated by steam from a steam line 25 which preferably is controlled automatically as will be brought out more clearly hereinafter.

As herein disclosed the dehumidifying action is obtained by the use of water sprayed into the interior of the dehumidifier 13. The water or other suitable liquid is pumped by means of a pump 26 from refrigerating or cooling means 26a through a pipe 27 and branch 28 to a spray pump 29, that in turn discharges the water through a spray device 30 into the interior of dehumidifier 13. The pipe 27 may be provided between the pump 26 and the branch with a regulating valve 31 and, at a point between the pump 26 and the branch 28, may be connected with the lower part of the dehumidifier to permit the withdrawal of water therefrom and the return of the water to the spray pump 29 when the regulating valve 31 is closed. The portion of the pipe 27 between the branch 28 and the connection with the dehumidifier is provided with a reverse acting cold water valve 33, which, when the regulating valve 31 is closed, permits water from the dehumidifier to be passed through the pipe 27 and branch 28 back to spray pump 29 and again passed into the dehumidifier. When the regulating valve 31 closes partially or entirely, the water pressure in the pipe 27 would build up rapidly. To avoid difficulties of this kind, the pipe 27 may be provided, between the pump 26 and the branch 28, with a branch 34 including a pressure control device 35 which will function so as to modulate the refrigerating rate accordingly between determined limits.

The present invention also involves the provision of an improved and automatic control whereby the influences of different factors may be substantially balanced and very satisfactory results may be obtained. The various controls may be actuated by any suitable system such, for example, as one using air, oil, or water. For convenience, the description will be directed to a compressed air system, air being supplied from a suitable source 35, such as a tank, to a pipe system including two main branches or lines 37 and 38.

As here shown, the branch 37 is connected with a motor 38a which opens the small fresh air damper when compressed air is turned on in the system and closes this damper when the supply is shut off, and also is connected with a controlling valve 21 for the first reheater through a quick acting thermostat 39 of which the sensitive part is located in the current of air entering through the small fresh air damper 11. The branch 37 is also connected through an outside-air-balance remote-control thermostat 40 with the primary dry bulb thermostat 6 of which it controls the setting. As herein disclosed the air for both thermostats 39 and 40 is taken from branch 37 through a single line 41 from which branches 42 and 43 pass to thermostat 39 and valve 21 and to thermostat 40 and primary thermostat 6, respectively. It will be evident that when the outside air is at a higher temperature than that at which the thermostat 39 acts, no steam will be supplied to the first preheater 19.

The branch 37 is also connected through a line 44, under control of the primary thermostat 6, with a secondary dry bulb thermostat 46 projecting into the main inlet duct 1a. This primary thermostat merely controls the setting of the thermostat 46 which controls the action of air through a line 47 connected with the branch 38 and is connected at the other side of the thermostat 46, with a device or motor 47a operating the damper 17 and with a device or motor 48 operating the dehumidifier damper. The air which passes the thermostat 46 in the line 47 may also serve to control the supply of steam to the reheater 24 through the steam line. To this end the line 25 is provided with a regulating valve 49 connected with line 47 by a connecting line 50 containing a manually operable valve 51 which is to be open only during the colder months, a period that may include spring and fall as well as winter. Under some conditions, where it would not be necessary to open the valve 51, it might be desirable to supply some steam to said reheater. For this purpose, provision is made of a bypass 52 around the valve 49 containing a valve 53 controlled by a line 54 connected with the line 50 between the valve 49 and the line 47. The valve 53 opens at a lower air pressure than valve 49 and the requirement for heat that causes the valve 53 to open may be satisfied before a condition is reached that would require the valve 49 to open. In practice it may be desirable to keep the valve 51 open at all times since the pressure in the line 47 is built up gradually by the controlled leakage of air past thermostat 46 and may adjust conditions by shifting dampers 17 and 18 without reaching pressures which would open valves 49 and 53. When the thermostat 46 shuts off the air supplied by the line 38, the air in the line 47 beyond the thermostat 46 may be discharged slowly and permit the dampers and other parts to be restored to normal setting by suitable means such as springs.

The primary hygrostat 7 is utilized to vary the setting of a dew point thermostat 55 in the dehumidifier 13, and as illustrated, the power for changing the setting may be supplied through a connection 56 with the line 37. As here shown the dew point thermostat 55 controls the supply of power through a line 57 and, through suitable connections 58, 59, 60, 61 and 62, controls the valve 31 that regulates the refrigerating action, the large fresh air damper 12 through a motor device 63, the relief damper 4 for the exhaust chamber 3 through a motor device 63a, the re-used air damper 8 through a motor device 64, and the regulating valve 23 for the second preheater 19, respectively. Thus, when the temperature at the thermostat 55 is too low, for the setting established by the primary hygrostat 7, the power from the line 57 tends to close the valve 31 to reduce the refrigerating action, to open the large fresh air damper 12, to close the reused air damper 8, to open the relief damper 4 to the atmosphere, and to open the valve 23 to admit steam to the second reheater 23. When the temperature at the thermostat 55 rises again these tendencies will be reversed. The pressure in the line 57 is built up gradually by controlled leakage of air past the dew point thermostat 55 and the working of the dampers 4, 8 and 15 may be effected without building up pressures sufficient to operate valve 23 for the second preheater and valve 31 controlling the refrigerating apparatus.

It is also desirable to maintain a substantially uniform static air pressure in the enclosure to be ventilated. This result may be attained (Fig. 1) by use of a constant pressure plenum producer or device 65 having a member or paddle 66 projecting into the supply air duct for the ventilated enclosure or space and controlling the passage of air from the compressed air line 38 to controlling means which may include a variable speed controller 67 for a fan motor (not shown) driving the supply fan 16, in accordance with the deflection of said paddle by the air and a damper 69 controlled by the device 65 through a motor 70 so that the damper will tend to close when the air pressure goes too high. As shown in Fig. 3, the same general result may be obtained by use of a damper 69a adjacent to the reheater 24 and controlled by a motor device 70a. For example, operation of the damper to close the same will decrease the total effective cross-sectional area of the by-pass and the dehumidifier and therefore increase the resistance to the action of the fan so as to decrease the amount of air supplied by the fan 16 to the room A. Fig. 2 shows an arrangement in which use is made of a damper 69b at the inlet of the supply fan 16 and controlled by a motor 70b, and Fig. 4 shows a form in which provision is made of a bypass 71 from the discharge end of the supply fan 16 to the mixing chamber 15 and a damper 69c operated by means of a motor 70c and arranged to close when the air pressure rises above a predetermined pressure.

The settings of the primary thermostat and of the primary thermostat and of the master primary hygrostat must be changed for different seasons. Preferably the setting of the primary thermostat is effected by a remote recording dial controller 72 and that of the primary hygrostat 7 by a corresponding remote control 72a. For summer operation, the primary thermostat 6 may be set for 80° and the primary hygrostat for 50 per cent relative humidity; and for winter operation the first setting may be for 70° and the second for 35 percent relative humidity.

Thermostat 46 in the supply fan discharge is used in connection with the primary thermostat 6 and the thermostat 40 at the fresh air intake to maintain a predetermined and balanced leaving temperature between that of outdoors and the setting of the primary thermostat in the reused air duct 3a. Based upon the setting of 80° and a 15° difference in the entering temperature, which would be 65°, the heat gain in the conditioned space, due to the number of people and lights therein and other causes, is calculated and then there is determined the proper amount of air to be circulated. The relation of the temperatures at the primary thermostat 6 and at the fan discharge thermostat 46 to the temperature at the thermostat 40 may, for example, be such as indicated in the following table:

*Cooling season*

| Outdoor | Reused | Air duct | Fan discharge |
|---|---|---|---|
| 95° DB | 80° DB | 66° WB | 65° DB |
| 90° DB | 78° DB | 65° WB | 66° DB |
| 85° DB | 76° DB | 64° WB | 67° DB |
| 80° DB | 75° DB | 63½° WB | 68° DB |
| 75° DB | 73° DB | 62½° WB | 69° DB |
| 70° DB | 72° DB | 62° WB | 70° DB |

With the primary thermostat setting of 80° and the corresponding primary hygrostat setting, the operation of the apparatus is substantially as follows: The exhaust fan 2 and the supply fan 16 are started and compressed air is admitted to the line 36 thus actuating the motor device 38a to open the small fresh air damper 11. Fresh air will then be drawn in through the damper 11 and air will be circulated through the ventilated space, being drawn therefrom by the exhaust fan 2 and discharged into the exhaust chamber 3. The relative amounts of reused air and fresh air to be admitted to the mixing chamber 9 are determined by the settings of the reused air damper 8 and of the large fresh air damper 12 each of which is opened as the other is closed and vice versa. Also when the damper 8 is opened the exhaust or relief damper 4 is closed and vice versa, the relief damper thus disposing of any air that is not to be reused. The primary hygrostat 7 sets the dew point thermostat 55 in the dehumidifier 13 and, when the temperature at this position falls too low, compressed air is admitted under control to the line 57 thus moving the fresh air damper 15 toward open position, the reused air damper 8 toward closed position and the relief damper 4 toward open position. The valve 31 controlling the cooling of the dehumidifier and the valve 23 controlling the second preheater will not, however, be actuated unless this condition is maintained long enough for the required pressure to build up in the line 57. Then the action of the cooling system would be decreased and the second preheater 19 would be brought into use.

The mixture of air in the chamber 9 passes partly through the dehumidifier 13 and partly through the shunt 14 to the second mixing chamber 15. The proportion of dehumidified air in this mixture is greater when a lower temperature is required and less when a higher temperature is required, as determined by the dehumidifier air damper 18 and the shunt damper 17, one of which is opened as the other is closed and vice versa under control of the outside air thermostat 40, the primary thermostat 6 of which the setting is varied by the thermostat 40, and the thermostat 46 of which the setting is varied by the primary thermostat 6.

When the temperature in the supply duct becomes too low in view of the setting of the secondary thermostat 46, compressed air is permitted to pass into the line 47 where it will act on the dampers 17 and 18, which together act as a heat balance device, to open the damper 17 and close the damper 18. If this shifting of dampers 17 and 18 does not bring the temperature in the supply duct 1a to the required level, pressure will build up in the line 47 and open the bypass steam valve 53 to admit steam to the reheater 24. If the temperature in the supply duct still remains too low, the pressure in the line 47 will build up sufficiently to open the steam valve 49 and supply a greater amount of steam to the reheater. Ordinarily the valve 49 will be opened only under winter conditions.

In connection with such other features of control, the constant pressure plenum control device 65 at the outlet side of the supply fan 32 will, as already described, vary the amount of air passing through the supply duct 1a, thereby varying the air pressure in the ventilated space.

According to the present invention, the refrigeration rate may be changed automatically as required by conditions and with a predetermined lag which may be of great value, and where chilled water is used both the temperature and the volume or quantity thereof may be controlled and regulated. The temperature or heat-sensitive elements of the different instruments may be located where desired and the other parts of these instruments may be in a remote location or locations and may include recording devices. In this connection it should be understood that, whenever it is stated that an instrument such as a thermostat is in a certain duct, it is intended to mean that the sensitive element of the instrument is so located, the location of the other parts being varied as desired.

Preferably the dehumidifier is provided with a moisture eliminator 73. In addition to moisture, impurities in the air collect on the parts of the eliminator, thus producing an undesirable condition which necessitates cleaning of such parts. Heretofore such cleaning has been done manually but according to the present invention this cleaning is effected by suitable means such as a continuously acting perforated pipe 74 from which water drips slowly. For convenience the supply of liquid for the purpose is taken from the spray device 30.

Various changes may be made in various features of the invention and certain features may be used without others without departing from the true scope and spirit of the invention.

Having thus described my invention, I claim:

1. In an air conditioning system, the combination of air supply and return ducts connected with the space to be ventilated and air conditioning means connecting said return and supply flues and including a fresh air intake to supply fresh air for admixture with reused air from the return flue, a dehumidifier through which is passed part of the air for the supply duct, a shunt for the remainder of the air passed to the supply duct, a thermostat in the supply duct, means controlled by the supply duct thermostat for varying the relative proportion of air passing through the dehumidifier and the shunt respectively and a thermostat in the return duct for varying the setting of the thermostat in the supply duct.

2. In an air conditioning system, the combination of air supply and return ducts connected with the space to be ventilated and air conditioning means connecting said return and supply flues and including a fresh air intake to supply fresh air for admixture with reused air from the return flue, a dehumidifier through which is passed part of the air for the supply duct, a shunt for the remainder of the air passed to the supply duct, a thermostat in the supply duct, means controlled by the supply duct thermostat for varying the relative proportions of air passing through the dehumidifier and the shunt respectively, and means including a thermostat in the return duct and a thermostat in the fresh air duct for varying the setting of the thermostat in the supply duct.

3. In an air conditioning system, the combination of air supply and return ducts connected with the space to be ventilated and air conditioning means connecting said return and supply flues and including a fresh air intake to supply fresh air for admixture with reused air from the return flue, a dehumidifier through which is passed part of the air for the supply duct, a shunt for the remainder of the air passed to the supply duct, a thermostat in the supply duct, means controlled by the supply duct thermostat for varying the relative proportion of air passing through the dehumidifier and the shunt respectively, a thermostat in the return duct for varying the setting of the supply duct thermostat, and a thermostat at said air intake for varying the setting of the return duct thermostat.

4. In an air conditioning system, the combination of air supply and return ducts connected with the space to be ventilated and air conditioning means connecting said return and supply ducts and including a fresh air intake to supply fresh air for admixture with reused air from the return duct, a dehumidifier through which is passed part of the air for the supply duct, a shunt for the remainder of the air passed to the supply duct, a thermostat in the supply duct, means controlling said thermostat for varying the proportions of air passing through the dehumidifier and shunt respectively, and thereby controlling the temperature of the air delivered to the supply duct, and heating means brought into action by the supply duct thermostat in case the variation of the proportions of air be insufficient to raise the temperature as required.

5. In an air conditioning system the combination of air supply and return ducts both connected with a space to be ventilated, and air conditioning means connecting said return and supply ducts and including a fresh air intake to supply air to replace part of the returned air and to be mixed with the remainder thereof, a relief outlet for the returned air replaced by fresh air, a dehumidifier through which part of the air passes to the supply duct, means for cooling the dehumidifier, a thermostat in said dehumidifier, means controlled by said thermostat for varying the amount of fresh air taken in and the amount of returned air discharged while maintaining these amounts substantially equal and means controlled by said thermostat for gradually varying the action of the cooling means.

6. In an air conditioning system, the combination of an air supply duct and a return duct connected with a space to be ventilated and air conditioning means connecting said return and supply ducts and including a fresh air intake to supply air to replace part of the returned air and to be mixed with the remainder thereof, a relief outlet for the returned air replaced by fresh air, a dehumidifier through which part of the air passes to the supply duct, a thermostat controlled by the temperature in said dehumidifier, means controlled by said thermostat for varying the amount of fresh air taken in and the amount of returned air discharged while maintaining these amounts substantially equal, a heater adjacent to said intake, and means controlled by said thermostat for varying the action of said heater.

7. In an air conditioning system, the combination of an air supply duct and a return duct connected with a space to be ventilated and air conditioning means connecting said supply and return ducts and including a fresh air intake to admit air to replace part of the returned air and to be mixed with the remainder thereof, a relief outlet for the returned air replaced by fresh air, a dehumidifier through which part of the air passes to the supply duct, a thermostat controlled by the temperature in said dehumidifier, means controlled by said thermostat for varying the amount of fresh air taken in and the amount of returned air discharged while maintaining the amounts substantially equal, means controlled by said thermostat for varying the cooling of said dehumidifier, a heater adjacent to said intake, and means controlled by said thermostat for varying the action of said heater.

8. In an air conditioning system the combination of an air supply duct and a return duct connected with a space to be ventilated; air conditioning means connecting said return and supply ducts including means for mixing fresh air and used air and conditioning part thereof, means controlled by the humidity and temperature of the air passing through said supply duct and air conditioning means for varying the mixture and also the temperature and humidity of the air furnished to the supply duct, and means controlled by the pressure of the air in said supply duct and the space to be ventilated for varying the amount of the mixture supplied through the supply duct to the ventilated space to maintain substantially uniform pressure in the ventilated space.

9. In an air conditioning system, the combination of air supply and return ducts both connected with a space to be ventilated, an air conditioning means connecting said return and supply ducts and including a fresh air intake for replacing part of the returned air and forming a mixture with the remainder of the returned air, a relief outlet for the returned air thus replaced, a dehumidifier through which part of said mixture passes on its way to the supply duct, a shunt through which the rest of the mixture passes on its way to the supply duct, a thermostat in said dehumidifier, means controlled by said thermostat for varying the amount of fresh air received and the amount of return air discharged, means controlled by said thermostat for controlling the action of said dehumidifier, a wet bulb thermostat in the return duct, means whereby said wet bulb thermostat controls the setting of the thermostat in the dehumidifier, and a dry bulb thermostat in said return duct controlling the setting of said wet bulb thermostat.

10. In an air conditioning system, the combination of air supply and return ducts both connected with a space to be ventilated, an air conditioning means connecting said return and supply ducts and including a fresh air intake for replacing part of the returned air and forming a mixture with the remainder of the returned air, a relief outlet for the returned air thus replaced, a dehumidifier through which part of said mixture passes on its way to the supply duct, a shunt through which the rest of the mixture passes on its way to the supply duct, a thermostat in said dehumidifier, means controlled by said thermostat for varying the amount of fresh air received and the amount of return air discharged, means controlled by said thermostat for controlling the action of said dehumidifier, a wet bulb thermostat in the return duct, means whereby said wet bulb thermostat controls the setting of the thermostat in the dehumidifier, a dry bulb thermostat in said return duct controlling the setting of said wet bulb thermostat, and a fresh air thermostat controlling the setting of the dry bulb thermostat in the return duct.

11. In an air conditioning system, the combination of air supply and return ducts both connected with a space to be ventilated, an air conditioning means connecting said return and supply ducts and including a fresh air intake for replacing part of the returned air and forming a mixture with the remainder of the returned air, a relief outlet for the returned air thus replaced, a dehumidifier through which part of said mixture passes on its way to the supply duct, a shunt through which the rest of the mixture passes on its way to the supply duct, a thermostat in said dehumidifier, means controlled by said thermostat for varying the amount of fresh air received and the amount of return air discharged, means controlled by said thermostat for controlling the action of said dehumidifier, a wet bulb thermostat in the return duct, means whereby said wet bulb thermostat controls the setting of the thermostat in the dehumidifier, a primary thermostat in said return duct controlling the setting of said wet bulb thermostat, a supply duct thermostat controlled by the primary thermostat, means whereby the supply duct thermostat controls the relative amounts of air passing through the dehumidifier and the shunt, and means whereby the supply duct thermostat controls the temperature of the mixture passing through the shunt.

12. In an air conditioning system, the combination of air supply and return ducts both connected with a space to be ventilated, an air conditioning means connecting said return and supply ducts and including a fresh air intake for replacing part of the returned air and forming a mixture with the remainder of the returned air, a relief outlet for the returned air thus replaced, a dehumidifier through which part of said mixture passes on its way to the supply duct, a shunt through which the rest of the mixture passes on its way to the supply duct, a thermostat in said dehumidifier, means controlled by said thermostat for varying the amount of fresh air received and the amount of return air discharged, means controlled by said thermostat for regulating the action of said dehumidifier, a wet bulb thermostat in the return duct, means whereby said wet bulb thermostat controls the setting of the thermostat in the dehumidifier, a primary thermostat in said return duct controlling the setting of said wet bulb thermostat, a supply duct thermostat controlled by the primary thermostat, means whereby the supply duct thermostat controls the relative amounts of air passing through the dehumidifier and the shunt, means whereby the supply duct thermostat controls the temperature of the mixture passing through the shunt, and a fresh air thermostat controlling the setting of the primary thermostat.

ANDRÉ MERLE.